US009420128B2

(12) United States Patent
Tredoux et al.

(10) Patent No.: US 9,420,128 B2
(45) Date of Patent: Aug. 16, 2016

(54) SYSTEMS AND METHODS FOR ESTABLISHING MOBILE USER PROXIMITY VIA ACTIVE MIMICRY

(71) Applicant: XEROX CORPORATION, Norwalk, CT (US)

(72) Inventors: Gavan L. Tredoux, Penfield, NY (US); Roger T. Kramer, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 192 days.

(21) Appl. No.: 13/856,626

(22) Filed: Apr. 4, 2013

(65) Prior Publication Data

US 2014/0300924 A1    Oct. 9, 2014

(51) Int. Cl.
*H04N 1/00* (2006.01)
(52) U.S. Cl.
CPC ....... *H04N 1/00408* (2013.01); *H04N 1/00204* (2013.01); *H04N 2201/0055* (2013.01); *H04N 2201/0094* (2013.01); *H04N 2201/0098* (2013.01)
(58) Field of Classification Search
None
See application file for complete search history.

(56) References Cited

U.S. PATENT DOCUMENTS

| 2006/0028398 | A1* | 2/2006 | Willmore | 345/2.3 |
|---|---|---|---|---|
| 2006/0293765 | A1* | 12/2006 | Tanaka et al. | 700/15 |
| 2009/0113294 | A1* | 4/2009 | Sanghavi et al. | 715/269 |
| 2010/0309510 | A1* | 12/2010 | Hansen | 358/1.15 |
| 2011/0256881 | A1* | 10/2011 | Huang et al. | 455/456.1 |
| 2012/0323700 | A1* | 12/2012 | Aleksandrovich et al. | 705/14.69 |

OTHER PUBLICATIONS

"How to set up a Bluetooth connection in Ubuntu (12.04)" http://www.hecticgeek.com/2012/09/how-to-set-up-a-bluetooth-connection-in-ubuntu/ dated Oct. 23, 2012 posted by Gayan.*

* cited by examiner

*Primary Examiner* — Ming Hon
(74) *Attorney, Agent, or Firm* — MH2 Technology Law Group LLP

(57) ABSTRACT

The present invention generally relates to systems and methods for ensuring proximity between a first, e.g., mobile device, such as a smart phone, and a second, e.g., immobile device, such as a multi-function device. The invention can include the second device displaying a pattern that represents a series of movements, which a user of the first device can mimic. The first device can thus prove that it and its user are in proximity to the second device.

18 Claims, 3 Drawing Sheets

SYSTEMS AND METHODS FOR ESTABLISHING MOBILE USER PROXIMITY VIA ACTIVE MIMICRY

FIELD OF THE INVENTION

This invention relates generally to establishing physical proximity between a first device and a second device.

BACKGROUND OF THE INVENTION

It is useful and desirable to develop assurance of the physical proximity of the user of a device, such as a multifunction device. The user may employ a mobile device to control the multifunction device using a standard protocol such as TCP/IP, but the communication protocol does not itself provide any assurance of physical proximity. For example, a TCP/IP connection provides no assurances that the user is not in another country, nor outside the building in the parking lot.

Assurance of physical proximity allows well-understood and easy-to-use concepts of physical security to be leveraged (e.g., locked doors, required passes, guards at entrances, etc.). Existing methods for detecting proximity include those that require typing, which is inconvenient using many mobile devices.

SUMMARY

According to an embodiment, a method for confirming proximity of a first device to a second device is presented. The method includes providing a pattern comprising a first series of movements, receiving data from the first device, the data representing a second series of movements, determining that the data from the first device matches the first series of movements, and enabling the first device to invoke a function of the second device.

According to an embodiment, a method for confirming proximity of a first device to a second device is presented. The method includes providing a pattern comprising a first series of movements, receiving data from the mobile device, the data representing a second series of movements, determining that the data from the mobile device matches the first series of movements, enabling the mobile device to invoke a function of the immobile device, receiving, at the immobile device, a command from the mobile device, and executing the function by the immobile device in response to the command.

Various optional features of the above embodiment include the following. The providing can include displaying the pattern on a display of the immobile device. The method can include obtaining the pattern from a trusted third party. The function can include printing a file. The method can include receiving, from the mobile device, data representing the file at the immobile device. The function can include scanning a document and providing data representing the document to the mobile device. The data from the mobile device can include data representing a series of interactions with a touchscreen of the mobile device. The data from the mobile device can include data representing a series of movements detected by at least one sensor capable of detecting movement of the mobile device. The receiving data from the mobile device, the data representing a second series of movements, can include receiving the data by a trusted third party. The method can include displaying, on a display of the mobile device, an indication representing the second series of movements.

According to an embodiment, a system for confirming proximity of a first device to a second device is presented. The system includes at least one processor configured to provide a pattern comprising a first series of movements, at least one processor configured to receive data from the mobile device, the data representing a second series of movements, at least one processor configured to determine that the data from the mobile device matches the first series of movements, at least one processor configured to enable the mobile device to invoke a function of the immobile device, at least one processor configured to receive, at the immobile device, a command from the mobile device, and at least one processor configured to execute the function by the immobile device in response to the command.

Various optional features of the above embodiment can include the following. The at least one processor configured to provide can be further configured to display the pattern on a display of the immobile device. The system can include at least one processor configured to obtain the pattern from a trusted third party. The function can include printing a file. The system can include at least one processor configured to receive, from the mobile device, data representing the file at the immobile device. The function can include scanning a document and providing data representing the document to the mobile device. The data from the mobile device can include data representing a series of interactions with a touchscreen of the mobile device. The data from the mobile device can include data representing a series of movements detected by at least one sensor capable of detecting movement of the mobile device. The at least one processor configured to receive data from the mobile device can be present at a trusted third party. The system can include at least one processor configured to display, on a display of the mobile device, an indication representing the second series of movements.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
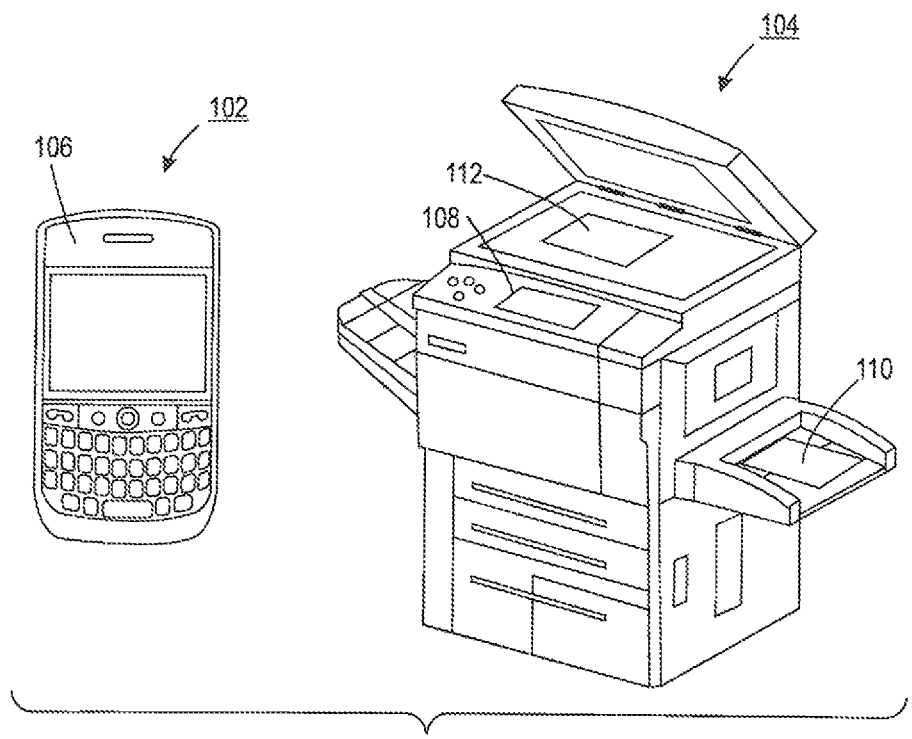
FIG. 1 is a schematic diagram of a system according to some embodiments.

FIG. 1 is a schematic diagram of a system according to some embodiments. The example system includes mobile device 102 and immobile device 104.

Mobile device 102 can be, for example, a smart telephone. In some implementations, mobile device 102 can be, for example, a tablet computer. Mobile device 102 can include a persistent memory, a volatile memory, and one or more processors capable of executing program instructions to at least partially implement the techniques disclosed herein.

Mobile device 102 further includes a touchscreen 106. Touchscreen 106 is capable of displaying images and receiving user input. For receiving user input, touchscreen 106 can utilize any of various technologies, e.g., resistive, surface acoustic wave, capacitive (e.g., surface capacitance, projected capacitance, mutual capacitance or self-capacitance), infrared, optical imaging, dispersive signal technology or acoustic pulse recognition. Touchscreen 106 is capable of displaying any image while receiving user input.

Mobile device 102 further includes one or more sensors capable of detecting movement, e.g., in three dimensions. In some embodiments, the sensors include a set of accelerometers. The accelerometers can be situated internal to mobile device 102. Mobile device 102 can utilize any of various technologies for the accelerometers, e.g., microelectromechanical systems such as surface micromachine capacitive accelerometers. The accelerometers can include three accelerometers oriented along three mutually-perpendicular axes to detect movement in any of three dimensions. The accelerometers can be coupled to processing circuitry to convert raw data from the accelerometers into meaningful signals, e.g., amplitude of acceleration in each of three mutually-perpendicular directions. For example, the accelerometers can be associated with a software library in order to program mobile device 102 to utilize information from the accelerometers. In some embodiments, the sensors capable of detecting movement include a magnetic compass. In general, the sensors can be any components capable of detecting movement, not limited to accelerometers or a magnetic compass.

Mobile device 102 can further include an interface capable of establishing and maintaining communications wirelessly. Such an interface can comply with a variety of standards, e.g., 802.11a, 802.11n, etc. Using the interface, mobile device 102 can communicate using any of a variety of standards, e.g., TCP/IP, HTTPS, etc.

In some implementations, mobile device includes a radio-frequency interface for proximity-based communications. Such an interface can comply with any of a variety of standards, e.g., NFC, standards for RFID, etc.

Immobile device 104 can be, for example, a multi-function device. In general, a "multi-function device" for purposes of this document is an immobile device capable of printing onto paper and scanning paper. Immobile device 104 as depicted in FIG. 1 thus includes a scan bed 112. Scan bed 112 is capable of receiving paper, which immobile device 104 can scan to create, store, and send a digital image. Immobile device 104 can store the digital image in any of a variety of formats, e.g., bitmap, JPEG, GIF, PDF, etc. Immobile device 104 is further capable of printing paper Documents to paper tray 110. In some implementations, immobile device 104 can receive requests to print paper documents, e.g., from a computer; that is, in some implementations, immobile device can include network printing capabilities. In some implementations, immobile device 104 can print copies of documents its scans using scan bed 112; that is, in some implementations, immobile device 104 can include copying capabilities.

Immobile device 104 further includes display 108. Display 108 is capable of displaying images. Thus display 108 can be, e.g., are LCD display (backlit or not backlit), a plasma display, an LED display, etc. In some implementations, display 108 is capable of showing hi-resolution images. In other implementations, display 108 is a simple collection of lights e.g., LCD lights.

Display 108 is capable of showing patterns of varying detail and complexity. In some implementations, display 108 is capable of showing a maze, e.g., the maze depicted in FIG. 2. Display 108 can be further capable of showing various icons, symbols, or other images, such as those depicted in FIG. 2. Display 108 in some embodiments can be capable of showing motion, e.g., videos in MP4 format.

In some implementations, immobile device 104 includes a wireline and/or wireless network interface. Such an interface can comply with a variety of standards, e.g., 802.11a, 802.11n, etc. Using the interface, immobile device 104 can communicate using any of a variety of standards, e.g., TCP/IP, HTTPS, etc.

In some implementations, immobile device 104 can be a kiosk. In such implementations, immobile device 104 can vend various data, e.g., MP3 audio files. To that end, immobile device 104 can include an input device, such as a keypad or touchscreen. In some implementations, the touchscreen can be implemented as part of display 108. Immobile device 104 can accept payment information for the data it vends.

In some implementations, immobile device 104 can be an information-providing station. In such implementations, immobile device 104 can receive and/or supply, e.g., medical records of patients and be located in a hospital or similar facility.

Figure 2:
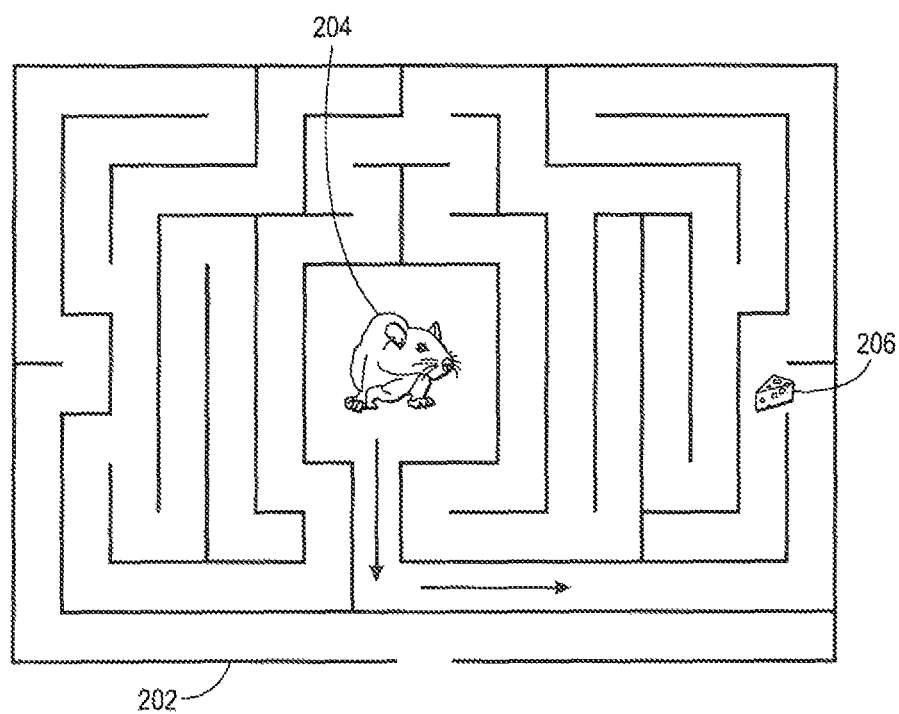
FIG. 2 depicts an example pattern according to some embodiments.

FIG. 2 depicts an example pattern according to some embodiments. The pattern includes maze 202, with rat 204 at its center and a depiction of cheese 206 at the end of the maze. The pattern can be displayed on an immobile device according to some embodiments.

The pattern of FIG. 2 depicts a series of movements. In the case of maze 202, the movements depicted are implied by the structure of the pattern. In particular, maze 202 requires a series of movements in order for rat 204 to reach cheese 206. For example, rat 204 must move down, then to the right, then up, then to the left, to reach cheese 206.

Figure 3:
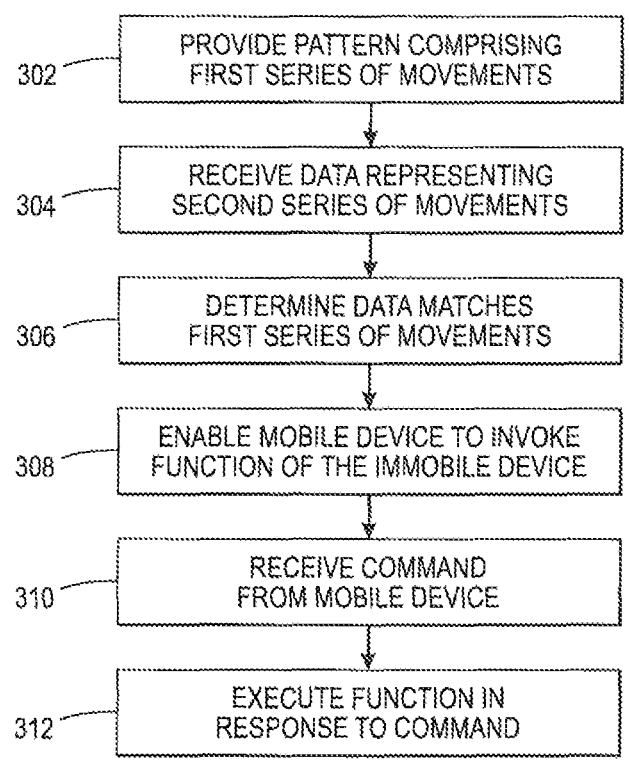
FIG. 3 is a flowchart of a method according to some embodiments.

FIG. 3 is a flowchart of a method according to some embodiments. The method of FIG. 3 can be implemented using mobile device 102 and immobile device 104 of FIG. 1. The method of FIG. 1 allows immobile device 104 to verify that it is in physical proximity to mobile device 102.

At the start of the method of FIG. 3, immobile device 104 and mobile device 102 can have an established communication channel, e.g., relying on an 802.11 standard. Using the communication channel, mobile device 102 can, to a limited extent, control immobile device 104. For example, mobile device 102 can be capable of requesting that immobile device 104 display a pattern according to block 302 of the method, but be unable to command immobile device 104 to print a document stored on mobile device 102 or scan a document to mobile device 102.

At block 302, immobile device 104 provides a pattern comprising a first series of movements. Immobile device 104 can provide the pattern by displaying it on display 108. Immobile device 104 can generate the pattern itself or obtain the pattern from a trusted third party. Mobile device 102 can trigger the display of the pattern by issuing a command to immobile device, e.g., using an 802.11 standard.

The pattern can be of various forms. For example the pattern can be in the form of a maze, e.g., maze 202 of FIG. 2. The pattern can be a form, e.g., a snake, moving about display 108 of immobile device 104. The pattern can be made visually interesting, possibly employing elements from fantasy games, e.g., crocodile chasing a maiden though the passageways of a castle. In each case, however, the pattern depicts, either explicitly or implicitly, a series of movements.

The pattern can include animated elements or be static. For example, mouse 204 of FIG. 2 can be shown moving about maze 202, or mouse 204 can remain in the middle of maze 202, with arrows depicting where mouse 204 can go. A snake can be shown moving about on display 108, or a snake can appear contorted into a series of turns. Thus, whether the pattern is animated, explicitly depicting a series of movements, or static, implicitly depicting a series of movements, the pattern includes a series of movements.

At block 304, immobile device 104 or a trusted third party receive data representing a second series of movements. In general, the data is provided by mobile device 102. More particularly, a user of mobile device 102 generates the data by supplying to mobile device 102 a second series of movements intended to match the first series of movements.

The user of mobile device 102 can supply the second series of movements in various ways. In some embodiments, the user mimics the first series of movements using a finger or stylus on touchscreen 106 of mobile device 102. For example, for maze 202 of FIG. 2, the user can first input a downward stroke on touchscreen 106, followed by a stroke to the right, etc. In some embodiments, the user mimics the first series of movements by moving mobile device 102 such that the accelerometers of mobile device 102 detect the movements. For example, for maze 202 of FIG. 2. the user can first move mobile device down, then to the user's right, etc.

Once mobile device 102 accepts the second series of movements from its user, mobile device 102 provides data representing the second series of movements to immobile device 104 or to a trusted third party. Mobile device 102 can provide the data using a wireless connection, e.g., an implementation of a 802.11 standard. The data itself can reflect a series of movements by following a convention. For example, in two dimensions, movements can be characterized by points on a compass, e.g., North, South, East, and West. These can be truncated to theft first letters and converted to a string of data representing the movements. Thus, for example, for maze 202 of FIG. 2, the downward movement, followed by a movement to the right, followed by a movement up, followed by a movement to the left, can be represented by the following string of data: SENW.

At block 306, immobile device 104 or a trusted third party determines whether the data matches the first series of movements. The matching process can be probabilistic, relying on a sufficient number of matches between individual movements in the first and second series of movements. This can be accomplished, e.g., using the following equation.

$$P = 1 - \frac{1}{4^N} \qquad (1)$$

In Equation (1), P represents the probability of a match from zero to one, and N represents a number of matching movement components, where four movement components are available (e.g., North, East, South and West). Embodiments can utilize fewer or more than four movement components; that is, are not limited to utilizing four movement components.

Thus, for example, for maze 202 of FIG. 2, the first series of movements can be characterized as SENW as discussed above. If the second series of movements is characterized by NENW, then three out of four movement components of the series of movements match. Accordingly, N=3, and from Equation (1), the probability of a match is $P=1-\frac{1}{4}^3=98.4\%$. If an example threshold of 99% is required to establish a match according to block 206, then, for this example, no match would be determined.

Various known string matching algorithms can be used to determine whether the data representing the second series of movements matches the first series of movements. For example, edit distance can serve as a metric for comparing two strings. The edit distance between two strings can be expressed as an integer, and Equation (1) can be implemented, with N representing the edit distance. As another example, dynamic programming can be used to compare strings and output an integer representation of their differences. To that end, the Levenshtein distance computing algorithm can be used.

In some embodiments, the data are required to match exactly for block 306 to determine a match between the data representing the second series of movements and the first series of movements.

At block 308, having determined that the user-input data representing the second series of movements sufficiently matches the first series of movements, the system enables mobile device 102 to invoke a function of immobile device 308 that was previously unavailable. This step can include unlocking features of immobile device 104 for remote control by mobile device 102. As discussed above, mobile device 102 can have an existing connection with immobile device 104, e.g., using an 802.11 standard, and mobile device 102 can issue commands to immobile device 104 using the connection. However, immobile device 104 can lock out certain functions prior to this step. At block 308, mobile device unlocks at least one function previously unavailable for invocation by mobile device 102. Example such functions include, by way of non-limiting example, printing a document stored on mobile device 102 and scanning a document to mobile device 102.

At block 310, immobile device 104 receives a command from mobile device 102. Mobile device 102 can issue the command using an existing communication channel between mobile device 102 and immobile device 104. The existing communication channel utilize, for example, and 802.11 standard. A user of mobile device 102 can issue the command by, for example, interacting with a graphical user interface executing on mobile device 102.

At block 312, immobile device 104 executes a function in response to the command received at block 310. In some implementations, the function of block 312 includes establishing a secure channel between mobile device 102 and immobile device 104. The secure communication channel can be formed according to a TCP/IP standard. In some implementations, the secure communication channel is formed in accordance with, e.g., HTTPS, SSL, or TLS. The secure communication channel can augment, replace, or complement any existing communication channel between mobile device 102 and immobile device 104.

In implementations where immobile device 104 is a multi-function device, the function can be printing a document sent from mobile device 102 using, e.g., an 802.11 standard. The document can be sent as an additional communication, and, in some implementations, can be encrypted for transfer. In such implementations, immobile device 104 can print the document it receives without awaiting further commands.

In implementations where immobile device 104 is a multi-function device, the function can be sending (e.g., via an 802.11 standard) a scanned document to mobile device 102. In such implementations, a user can place a document on scan bed 112, then activate mobile device 102 to initiate the scanning and document transfer. In some implementations, the scanned document can be encrypted for transfer to mobile device 102.

In implementations in which immobile device 104 is a kiosk vending data, e.g., MP3 audio files, the function can be an exchange of payment information for the vended data. Thus, immobile device 102 can supply payment information using an encrypted communication channel and receive a copy of the vended data on that or a different channel.

In implementations where immobile device is an information-providing station, e.g., situated in a hospital, the function of block 312 can be conveying a medical record from mobile device 102 to immobile device 104, or from immobile device 104 to mobile device 102. The medical record can be encrypted.

While example embodiments have been described herein in relation to a mobile device and an immobile device, the invention is not limited to such devices. For example, some embodiments include two mobile devices. In general, the invention can be practiced using any two devices, regardless as to their mobility or immobility statuses. Thus, the description above characterizing a device as "immobile" should be considered exemplary and non-limiting.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method for confirming proximity of a mobile device to an immobile device, the method comprising:
   providing a pattern comprising a first series of movements, wherein the providing comprises displaying a maze comprising the pattern on a display of the immobile device;
   receiving data from the mobile device, the data representing a second series of movements representing a traversal of the maze, wherein the pattern is not displayed on the mobile device;
   determining that the data from the mobile device matches the first series of movements;
   enabling the mobile device to invoke a function of the immobile device;
   receiving, at the immobile device, a command from the mobile device; and
   executing the function by the immobile device in response to the command.

2. The method of claim 1, further comprising obtaining the pattern from a trusted third party.

3. The method of claim 1, wherein the function comprises printing a file.

4. The method of claim 3, further comprising receiving, from the mobile device, data representing the file at the immobile device.

5. The method of claim 1, wherein the function comprises scanning a document and providing data representing the document to the mobile device.

6. The method of claim 1, wherein the data from the mobile device comprises data representing a series of interactions with a touchscreen of the mobile device.

7. The method of claim 1, wherein the data from the mobile device comprises data representing a series of movements detected by at least one sensor capable of detecting movement of the mobile device.

8. The method of claim 1, wherein the receiving data from the mobile device, the data representing a second series of movements, comprises receiving the data by a trusted third party.

9. The method of claim 1, further comprising displaying, on a display of the mobile device, an indication representing the second series of movements.

10. A system for confirming proximity of a mobile device to an immobile device, the system comprising:
    at least one processor configured to provide a pattern comprising a first series of movements and further configured to display a maze comprising the pattern on a display of the immobile device;
    at least one processor configured to receive data from the mobile device, the data representing a second series of movements representing a traversal of the maze, wherein the pattern is not displayed on the mobile device;
    at least one processor configured to determine that the data from the mobile device matches the first series of movements;
    at least one processor configured to enable the mobile device to invoke a function of the immobile device;
    at least one processor configured to receive, at the immobile device, a command from the mobile device; and
    at least one processor configured to execute the function by the immobile device in response to the command.

11. The system of claim 10, further comprising at least one processor configured to obtain the pattern from a trusted third party.

12. The system of claim 10, wherein the function comprises printing a file.

13. The system of claim 12, further comprising at least one processor configured to receive, from the mobile device, data representing the file at the immobile device.

14. The system of claim 10, wherein the function comprises scanning a document and providing data representing the document to the mobile device.

15. The system of claim 10, wherein the data from the mobile device comprises data representing a series of interactions with a touchscreen of the mobile device.

16. The system of claim 10, wherein the data from the mobile device comprises data representing a series of movements detected by at least one sensor capable of detecting movement of the mobile device.

17. The system of claim 10, wherein the at least one processor configured to receive data from the mobile device is present at a trusted third party.

18. The system of claim 10, further comprising at least one processor configured to display, on a display of the mobile device, an indication representing the second series of movements.

* * * * *